(12) United States Patent
Vassilieva et al.

(10) Patent No.: US 9,372,830 B2
(45) Date of Patent: Jun. 21, 2016

(54) SYSTEM AND METHOD TO ANALYZE IMPAIRMENT OF OPTICAL TRANSMISSIONS DUE TO COMBINED NONLINEAR AND POLARIZATION DEPENDENT LOSS

(71) Applicant: Fujitsu Limited, Kawasaki-shi, Kanagawa (JP)

(72) Inventors: Olga Vassilieva, Plano, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 618 days.

(21) Appl. No.: 13/672,470

(22) Filed: Nov. 8, 2012

(65) Prior Publication Data

US 2013/0275109 A1 Oct. 17, 2013

Related U.S. Application Data (60) Provisional application No. 61/623,912, filed on Apr. 13, 2012.

(51) Int. Cl.
| | | |
|---|---|---|
| *G06F 17/50* | (2006.01) | |
| *G06F 17/00* | (2006.01) | |
| *H04J 14/02* | (2006.01) | |
| *H04B 10/25* | (2013.01) | |

(52) U.S. Cl.
CPC ............... *G06F 17/00* (2013.01); *H04B 10/25* (2013.01); *H04J 14/0227* (2013.01); *H04J 14/0271* (2013.01)

(58) Field of Classification Search
CPC .... G01D 5/353; G01M 11/33; G01M 11/332; G01N 21/21; G06F 17/00; H04B 10/15; H04J 14/0227; H04J 14/0271

USPC ........... 356/73.1; 359/259; 358/11; 703/2, 13
See application file for complete search history.

(56) References Cited

U.S. PATENT DOCUMENTS

| | | | | |
|---|---|---|---|---|
| 5,311,346 A | * | 5/1994 | Haas ................... | H04B 10/2572 250/227.17 |
| 2002/0191903 A1 | * | 12/2002 | Neuhauser ........... | H04B 10/291 385/24 |
| 2007/0136012 A1 | * | 6/2007 | Miller ............................. | 702/67 |
| 2007/0147850 A1 | * | 6/2007 | Savory .................. | H04B 10/61 398/208 |
| 2010/0239254 A1 | * | 9/2010 | Li ....................... | H04B 10/2507 398/65 |
| 2010/0322622 A1 | * | 12/2010 | Shukunami ....... | H04B 10/07953 398/26 |

(Continued)

OTHER PUBLICATIONS

Smith, L.I., A Tutorial on Principle Component Analysis, Feb. 26, 2002, http://www.cs.otago.ac.nz/cosc453/student_tutorials/principal_components.pdf.*

(Continued)

*Primary Examiner* — Kamini S Shah
*Assistant Examiner* — Scott S Cook
(74) *Attorney, Agent, or Firm* — Baker Botts L.L.P.

(57) ABSTRACT

A system for modeling an optical signal transmission path of an optical network. The system may include a database configured to store a loss value associated with an interplay between a first loss characteristic and a second loss characteristic, the first and second loss characteristics associated with an optical signal within the optical signal transmission path. The system may also include a path computation engine configured to receive the loss value associated with the optical signal from the database and estimate, based on the loss value, a plurality of transmission characteristics of the optical signal transmission path.

15 Claims, 5 Drawing Sheets

(56) References Cited

U.S. PATENT DOCUMENTS

| | | | | |
|---|---|---|---|---|
| 2011/0243557 A1* | 10/2011 | Croussore | .......... | H04B 10/2557 398/45 |
| 2012/0219285 A1* | 8/2012 | Dahan | .............. | H04B 10/07953 398/26 |
| 2013/0142507 A1* | 6/2013 | Mandai | .................... | G02B 6/26 398/25 |

OTHER PUBLICATIONS

Chughtai, M.N., Dependence of Non-Linear Impairments on Polarization State and Baud Rate in WDM Systems with Mixed DQPSK and OOK Channels, IEEE, ICTON 2011, p. 1-4.*

Richardson, C.J.K., Statistical Evaluation of Polarization-Dependent Losses and Polarization Mode Dispersion in an Installed Fiber Network, CLEO CThU4 3:15 pm, 2002.*

Wai, R.K.A., Nonlinear Polarization-mode Dispersion in Optical Fibers with Randomly Varying Birefringence, J. Opt. Soc. Am. B, vol. 14, No. 11/Nov. 1997.*

Klingenberg, C.P., Multivariate Allometry, Advances in Morphometrics, Edited by L.P. Marcus et al, Plenum Press New Your 1996.*

Normal Distribution Defined, Wikipedia Archive Jan. 25, 2012 http://en.wikipedia.org/w/index.php?title=Normal_distribution&oldid=473159863.*

Gaussian q-Distribution Defined, Wikipedia Archive Mar. 4, 2012 http://en.wikipedia.org/w/index.php?title=Gaussian_q-distribution&oldid=480183710.*

Analyze Defined, The Random House College Dictionary, p. 48.*

Mori, K., Statistics and performance under combined impairment induced by polarization-dependent loss in polarization-division-multiplexing digital coherent transmission, Optics Express Dec. 12, 2011/ vol. 19, No. 26.*

Vassilieva, O., Interplay between PDL and Nonlinear Effects in Coherent Polarization Multiplexed Systems, ECOC Technical Digest 2011.*

Flury, B.K., An application of common principle component analysis to cranial morphometry of Microtus californicus and M. ochrogaster (Mammalia, Rodentia): further remarks J. Zool., Lond. 1988, 216, 41-43.*

Bechger, T.M., Principle Component Analysis for Exploratory Analysis of Multivariate Group Differences, Measurement and Research Department Reports, Feb. 2010 Cito Arnhem, 2010.*

Mori et al.; "Statistics and performance under combined impairments induced by polarization-dependent-loss in polarization-division-multiplexing digital coherent transmission"; Optics Express, vol. 19, No. 26; pp. B673-B680, Dec. 12, 2011.

* cited by examiner

FIG. 8

SYSTEM AND METHOD TO ANALYZE IMPAIRMENT OF OPTICAL TRANSMISSIONS DUE TO COMBINED NONLINEAR AND POLARIZATION DEPENDENT LOSS

RELATED PATENT APPLICATION

This application claims the benefit of U.S. Provisional Application No. 61/623,912, filed Apr. 13, 2012 and entitled "SYSTEMS AND METHODS FOR OPTIMIZING NETWORK SIMULATIONS."

TECHNICAL FIELD

The present invention relates generally to communication networks and, more particularly, to optimizing the design of an optical network.

BACKGROUND

Electronic digital signal processing ("DSP") has become a key technology in practical realization of 100 Gb/s (and higher data rate) dual polarization ("DP") coherent transmission systems. Thanks to it, the impact of polarization mode dispersion ("PMD"), chromatic dispersion ("CD") and to some extent nonlinear ("NL") effects has become a non-fundamental issue. Instead, polarization dependent loss ("PDL") emerges as the limiting factor, for which DSP can only compensate partially.

To date, the mechanism of the impact of PDL on DP signals is well understood. A single PDL element can cause power (and optical signal to noise ratio ("OSNR")) inequality between polarization tributaries and loss of orthogonality between initially orthogonal polarization states, depending on the angle between signal and PDL polarization axes. Since these two impairments occur simultaneously during transmission over multiple randomly oriented PDL elements, the statistics of such events was investigated recently.

However, one important aspect such as interplay between NL and PDL effects and its impact on system design has received little attention. For instance, interplay can occur when PDL-impaired signal propagates in optical fiber with Kerr nonlinearities, resulting in additional system penalties. The mechanism of the interplay between NL and PDL effects was investigated in great detail recently. In that work it was necessary to keep PDL elements and signals state of polarization ("SOP") aligned with respect to each other. Since a signal's SOP changes rapidly during transmission in an optical fiber, the next step should be to conduct a more comprehensive statistical analysis of the interplay between NL and PDL effects.

However, a comprehensive statistical analysis of the interplay of NL and PDL effects has not been investigated yet, even though it is very important for accurate estimation of the risk factors in system design.

SUMMARY OF THE DISCLOSURE

In accordance with embodiments of the present disclosure, a system for modeling an optical signal transmission path of an optical network is disclosed. The system may include a database configured to contain a loss value associated with the interplay between a polarization dependent loss and a nonlinear loss associated with an optical signal within the optical signal transmission path. The system may also include a path computation engine, network design tool/system, or modeling tool/system configured to receive the loss value associated with the optical signal from the database and estimate, based on the loss value, a plurality of transmission characteristics of the optical signal transmission path.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

As used herein, the term "computer-readable media" may be any available media that may be accessed by a general purpose or special purpose computer. By way of example, and not limitation, such computer-readable media may comprise tangible computer-readable including RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. Combinations of the above should also be included within the scope of computer-readable media.

Additionally, "computer-executable instructions" may include, for example, instructions and data which cause a general purpose computer, special purpose computer, or special purpose processing device to perform a certain function or group of functions.

As used herein, the term "module" or "component" may refer to software objects or routines that execute on a computing system. The different components, modules, engines, and services described herein may be implemented as objects or processes that execute on the computing system (e.g., as separate threads), as well as being implemented as hardware, firmware, and/or some combination of all three.

The following describes a statistical analysis of the interplay between NL and PDL effects, including how that interplay can significantly affect and even change the shape and width of the quality factor (i.e., Q-factor) distribution. The present disclosure describes a mechanism of the change of the shape of Q-factor distribution and discusses some factors that can affect this change. The present disclosure also describes a 2-dimensional method to analyze transmission effects due to combined NL and PDL impairments.

Figure 1:
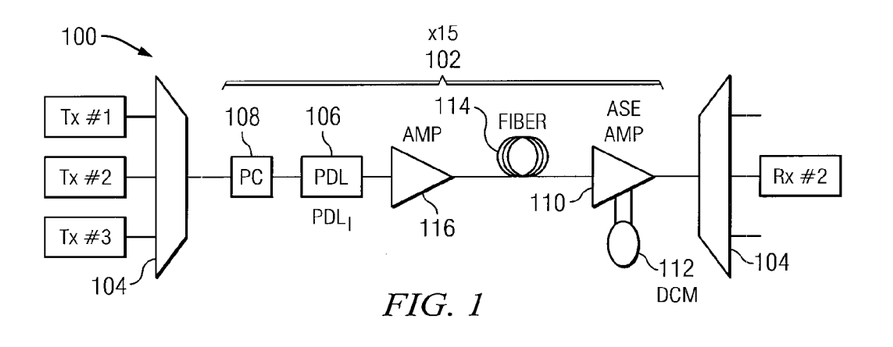
FIG. 1 illustrates an example simulation model for investigating the statistical behavior of interplay between NL and PDL effects, in accordance with certain embodiments of the present disclosure.

FIG. 1 illustrates an example simulation model 100 for investigating the statistical behavior of interplay between NL and PDL effects, in accordance with certain embodiments of the present disclosure. In some embodiments, the illustrative simulation model may include a distributed simulation model where span-by-span interaction between NL, PDL and amplified spontaneous emission ("ASE") noise is taken into account.

In some embodiments, simulation model 100 may include a plurality of nodes 104 connected by one or more span models 102. Span model 102 may, in some embodiments, include spans 114; one or more PDL element(s) 106 coupled to one or more polarization controller(s) ("PC") 108; and/or one or more amplified spontaneous emission ("ASE") amplifier(s) 110 coupled to PDL element(s) 106 and PC(s) 108. In some embodiments, ASE amplifier(s) 110 may be coupled to PDL element(s) 106 via fiber span 114 and/or amplifier 116, as described in more detail below. In the illustrative simulation model described below, simulation model 100 includes fifteen (15) fiber spans 114.

Further, in some embodiments, simulation model 100 may include dispersion compensation module ("DCM") 112. DCM 112 may be present or absent from simulation model 100 in order to modify the behavior of simulation model 100, as described in more detail below.

As an illustrative example of the operation of simulation model 100, the following example model is provided in order to aid in understanding of the present disclosure. One of ordinary skill in the art would recognize that variations in the structure, makeup, values, and/or organization of these components may be modified without departing from the scope of the present disclosure.

In order to investigate the statistical behavior of interplay between NL and PDL effects, the illustrative example simulation model 100 uses a distributed simulation model where span-by-span interaction between NL, PDL and ASE noise is taken into account. It contains one PDL element 106 per each node 104 with one PC 108 in front of the PDL element 106 to emulate random SOP. The bit error rate ("BER") Q-statistics may be obtained from a large number (e.g., 1000) simulation runs with random settings of SOPs. In the illustrative example, three 50 GHz-spaced channels with 100 Gb/s dual polarization quadrature phase shift keying (DP-QPSK) signals are transmitted over 15 spans×60 km (total 900 km) of NZ-DSF fiber.

In some embodiments, multiple types of dispersion maps may be considered in accordance with simulation model 100. For example: (i) a slightly under-compensated in-line dispersion map, which may be typical for brown field installations and (ii) without in-line dispersion compensation (DCM-less), which may be commonly used for green field 100+Gb/s deployment. In the illustrative example described, the fiber input power is set to −2.5 dBm/ch and received OSNR is set to 15 dB. TABLE 1 summarizes the simulation parameters. At the end of the transmission line, the performance of the center channel is evaluated with a coherent receiver. DSP of the coherent receiver performs compensation of the accumulated residual chromatic dispersion, polarization demultiplexing using constant modulus algorithm (CMA) and carrier phase recovery using a Viterbi-Viterbi algorithm. The BER values of each polarization channel are obtained by direct error counting and the total BER of the polarization multiplexed signal is averaged over BER's of each individual channel and then converted to Q.

TABLE 1

| EXAMPLE SIMULATION PARAMETERS | |
|---|---|
| Bit Rate | 112 Gb/s DP-QPSK |
| Chromatic Dispersion | 3.8 ps/nm/km @ 1545 nm |
| Dispersion Slop | 0.08 ps/nm$^2$/km @ 1545 nm |
| Nonlinear Coefficient | $3.3 \times 10^{-10}$/W |
| Transmission Distance | 900 km (15 × 60 km) |
| Channel Spacing | 50 GHz |

Signal degradation due to PDL strongly depends on the angle between signal and PDL polarization axes. PDL can cause loss of OSNR of the polarization tributary aligned with high loss PDL axis. In addition, it can cause the loss of orthogonality between two initially orthogonal polarization tributaries, when signal and PDL polarization axes are aligned at non-zero degree angle. The loss of orthogonality, in turn, can lead to generation of polarization crosstalk components, which can be effectively removed by DSP in the coherent receiver. Therefore, the dominant source of signal degradation due to PDL-only effects is the loss of OSNR, which cannot be compensated by any device.

On the other hand, PDL may worsen NL tolerance when a signal propagates in optical fiber with Kerr NL effects. In phase modulated signals, there may be certain interference components between signals. This interference may be due to the loss of orthogonality induced by PDL effects. This interference may affect result in relatively large, symbol-dependent optical peak power variations. These variations can cause additional penalties in system design and optimization. Therefore, the loss of orthogonality can be a contributing factor to the signal degradation under combination of NL and PDL effects.

Since NL and PDL impairments occur simultaneously during transmission over multiple fiber spans with multiple random PDL elements, it may be advantageous to investigate the statistics of a Q-factor distribution. For example, histograms of the Q-factor distribution may be obtained with 1000 random settings of SOP and with an accumulated mean PDL of 4 dB. Since impact of fiber nonlinearity strongly depends on dispersion map, it may be advantageous to compare the statistics for two types of dispersion maps: (i) with DCM and (ii) DCM-less. As described in more detail below with reference to FIGS. 2-3, in order to have one-to-one comparison of the shape of the Q-distribution for both dispersion maps, it may be advantageous to use the same set of random angles in each simulation run for both dispersion maps.

Figure 2:
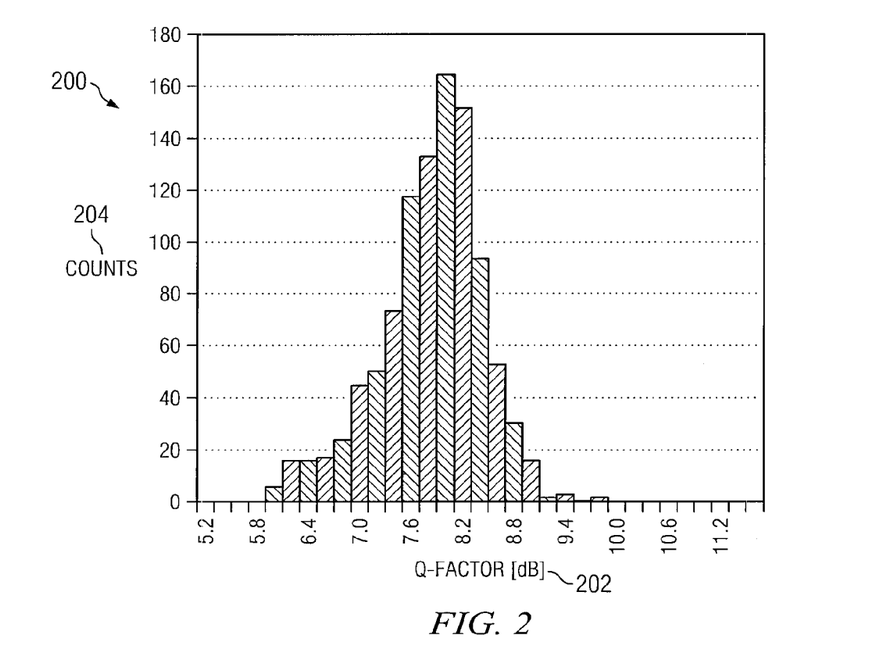
FIG. 2 illustrates an example histogram of a Q-factor distribution for an in-line DCM simulation, in accordance with certain embodiments of the present disclosure.

FIG. 2 illustrates an example histogram 200 of a Q-factor distribution for an in-line DCM simulation, in accordance with certain embodiments of the present disclosure. In some embodiments, example histogram 200 may result from a large number (e.g., 1000) of simulations run on simulation model 100 using an in-line DCM 112, as described in further detail above with reference to FIG. 1. Example histogram 200 plots the Q-factor 202 resulting from a given simulation against the count 204 of the number of simulations producing a given Q-factor 202.

Figure 3:
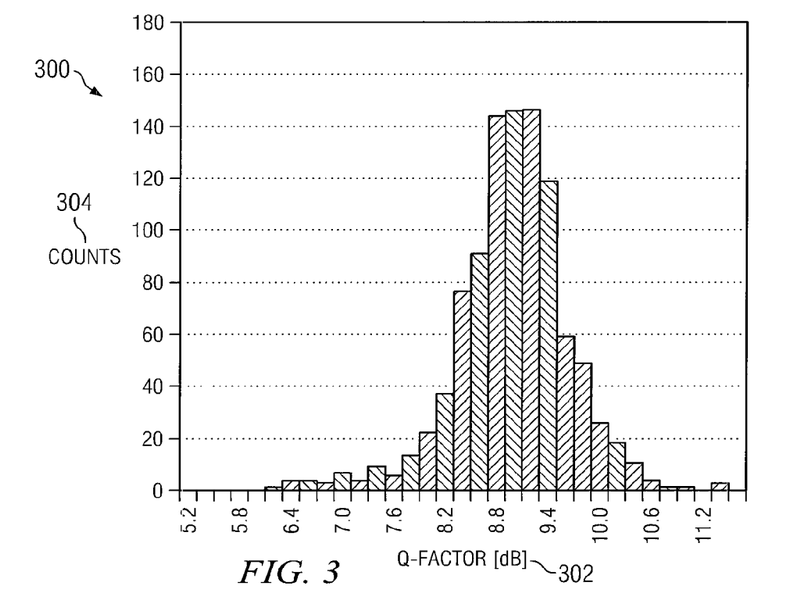
FIG. 3 illustrates an example histogram 300 of a Q-factor distribution for a DCM-less simulation, in accordance with certain embodiments of the present disclosure.

FIG. 3 illustrates an example histogram 300 of a Q-factor distribution for a DCM-less simulation, in accordance with certain embodiments of the present disclosure. In some embodiments, example histogram 200 may result from a large number (e.g., 1000) of simulations run on simulation model 100 without a DCM 112, as described in further detail above with reference to FIG. 1. Example histogram 300 plots the Q-factor 302 resulting from a given simulation against the count 304 of the number of simulations producing a given Q-factor 302.

In some embodiments, it may be necessary or desirable to compare and contrast example histogram 200 with example histogram 300. For example, using the illustrative data provided in FIGS. 2-3, a comparison may provide the following points: (1) Q-factor distribution 300 for DCM-less case looks more symmetric, with longer tails on each side of the distribution, while histogram 200 for DCM case is asymmetric with shorter tail in low-Q area and steep fall in high-Q area; (2) the Qmean of histogram 300 for the DCM-less case is 1.2 dB better compared to the Qmean of histogram 200 for the in-line DCM 112 case; and (3) the worst Q-factor shown in histogram 300 for the DCM-less case is only 0.3 dB better compared to the worst Q-factor shown in histogram 200 for the in-line DCM 112 case.

With regards to point (2), the improvement in mean Q-factor is somewhat expected because signals spread out quickly during DCM-less transmission, resulting in averaging the impact of fiber nonlinearities. With regards to point (3), the very small difference in the worst Q-factor indicates that in a low Q-factor area the PDL-induced loss of OSNR is the dominant source of signal degradation with a very minimal impact from fiber nonlinearities, i.e. 0.3 dB only.

However, since the tail of the Q-distribution in histogram 300 for the DCM-less case is longer than in histogram 200 for the case using DCM 112, the probability of getting Q=7.3 dB (at BER=$10^{-2}$) is only 2.4%, while it is 20% for in-line DCM 112.

Figure 4:
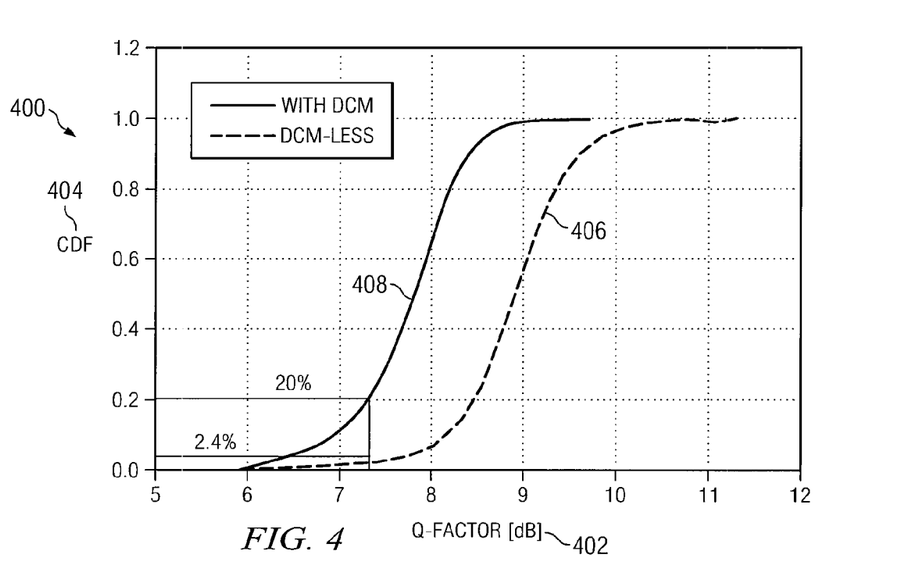
FIG. 4 illustrates an example cumulative distribution factor ("CDF") plot 400 comparing the CDF for the case using DCM in-line and for the case omitting DCM, in accordance with certain embodiments of the present disclosure.

FIG. 4 illustrates an example cumulative distribution factor ("CDF") plot 400 comparing the CDF for the case using DCM 112 in-line and for the case omitting DCM 112, in accordance with certain embodiments of the present disclosure. In some embodiments, CDF plot 400 may plot a given CDF 404 against the Q-factor 402. In the illustrative example, CDF plot 400 includes DCM CDF function 408 and DCM-less CDF function 406. In some embodiments, it may be necessary or desirable to compare the CDF functions 406, 408 of CDF plot 400.

Referring again to FIGS. 2-3, and with regard to point (1), the difference in shapes of the Q-distribution is directly related to the interplay between NL and PDL effects and can be explained as following. First of all, since loss of OSNR is the dominant source of signal degradation in systems with PDL, the Q values strongly depend on the amount of accumulated PDL in a transmission path. The best/worst Q-factor correspond to the case when individual PDL elements 106 along transmission path are coupled such that the total accumulated PDL is very small/large. Moreover, due to the limited number of PDL elements 106 in a transmission line, the tail of the distribution is finite, contrary to the infinite tail observed in PMD statistics. Second, the PDL-induced optical peak power variations (due to the loss of orthogonality) in the presence of fiber nonlinearities can cause additional penalties, resulting in re-shaping the Q-distribution from Qbest towards lower Q-factor. This change can be different depending on dispersion map. For example, in the case using an in-line DCM 112, the optical signals tend to preserve its original shape (and high peak power profile) due to periodic dispersion compensation, resulting in increased Q-penalty.

Thus, in reference to histogram 200, the large number of counts 204 appear in low Q-factor area and Q-distribution tends to be narrower and more asymmetric. In reference to histogram 300, the DCM-less case, the signals spread out quickly during transmission resulting in fast peak power reduction and large walk-off among channels, thus, minimizing the impact of NL effects. In this case the larger number of counts 304 stay in high Qfactor area compared to counts 204 of the histogram 200 for the case using an in-line DCM 112. Thus, Qdistribution tends to be more symmetric.

Since Q-distribution for combined NL and PDL effects is changing depending on dispersion map and other system parameters, it is clear that using 1-dimensional statistical analysis is not enough and could lead to erroneous results. A new 2-dimensional method to analyze transmission impairments due to combined NL and PDL effects can be helpful in future system design.

The impact of the interplay between NL and PDL effects can be observed on a 2-dimensional scatter plot of Q-factor for PDL versus Q-factor for combined NL and PDL effects (NL/PDL) for the same SOP, as described in more detail below with reference to FIGS. 5-6.

Figure 5:
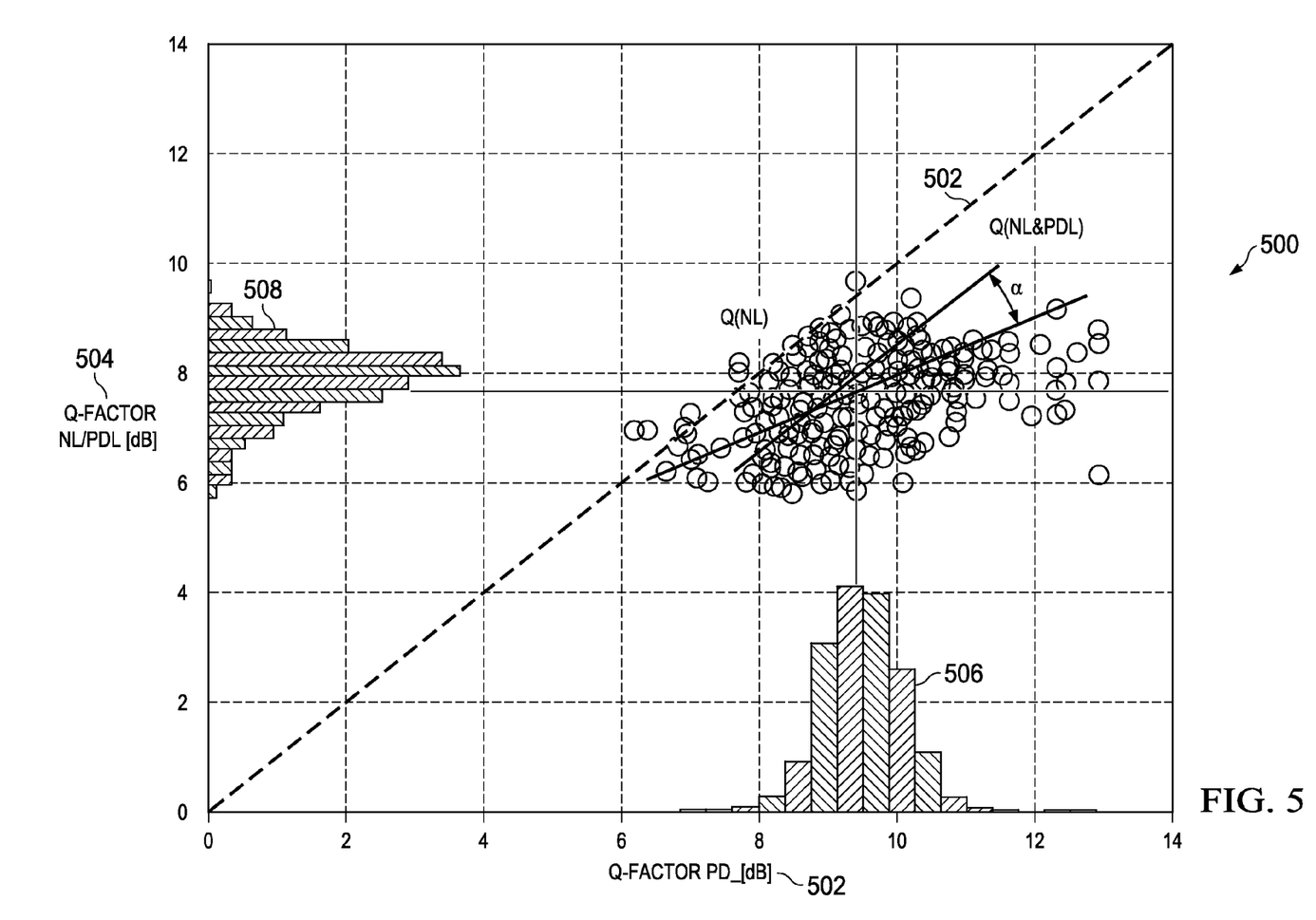
FIG. 5 illustrates an example scatter plot for a simulation using an in-line DCM, in accordance with certain embodiments of the present disclosure.

FIG. 5 illustrates an example scatter plot 500 for a simulation using an in-line DCM 112, in accordance with certain embodiments of the present disclosure. In some embodiments, example scatter plot 500 may result from a large number (e.g., 1000) of simulation run on simulation model 100 using an in-line DCM 112, as described in further detail above with reference to FIGS. 1-2. Example scatter plot 500 plots the Q-fact PDL 502 resulting from a given simulation against the Q-factor NL/PDL 504 for that simulation. To aid in understanding, scatter plot 500 also includes histograms 506, 508 corresponding to the PDL effect and combination NL/PDF effect, respectively.

Figure 6:
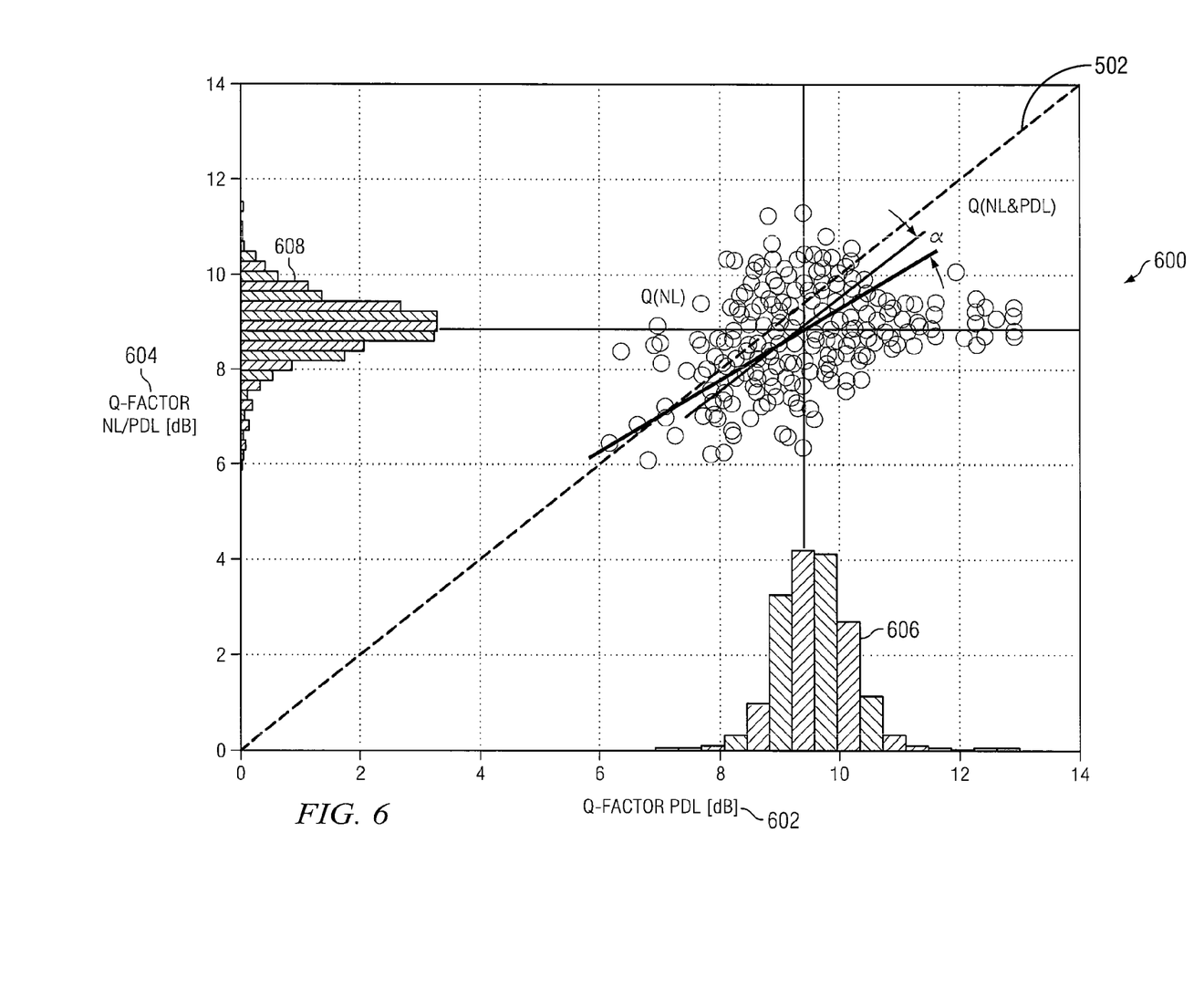
FIG. 6 illustrates an example scatter plot for a simulation run without using a DCM, in accordance with certain embodiments of the present disclosure.

FIG. 6 illustrates an example scatter plot 600 for a simulation run without using a DCM 112, in accordance with certain embodiments of the present disclosure. In some embodiments, example scatter plot 600 may result from a large number (e.g., 1000) of simulation run on simulation model 100 without using a DCM 112, as described in further detail above with reference to FIGS. 1 and 3. Example scatter plot 600 plots the Q-fact PDL 602 resulting from a given simulation against the Q-factor NL/PDL 604 for that simulation. To aid in understanding, scatter plot 600 also includes histograms 606, 608 corresponding to the PDL effect and combination NL/PDF effect, respectively.

In some embodiments, it may be necessary or desirable to compare and contrast scatter plots 500, 600. In such circumstances, a comparison (and/or contrast) may reveal important information. For example, in a situation such as that depicted in the illustrative examples of FIGS. 5-6, the scatter plots may be quite different from each other. In the absence of interplay between NL and PDL effects, the scatter points would be distributed along or parallel to dotted line 502. However, when comparing scatter plots 500, 600, a shift and rotation of the scatter plot is observable in scatter plot 500 for the case using the in-line DCM 112. The shift towards lower Q factor may be attributed to the fiber nonlinearity (QNL≈1.5 dB), while rotation by angle α≈22 deg to interplay between NL and PDL effects (NL&PDL), which somewhat squeezes the distribution. Because of this rotation the Q-distribution is more compact with shorter tails on both sides of the distribution. However, scatter plot 600, corresponding to the case in which no DCM 112 is used, illustrates points that are more aligned along dotted line 502, indicating the minimal impact of the interplay between NL and PDL effects.

There is a similar change in the shape of Q-distribution for a single mode fiber ("SMF"). However, the asymmetry in Q-distribution is slightly smaller compared to an Extra Large Effective Area Fiber ("E-LEAF") due to SMFs larger CD coefficient and larger residual dispersion ("RD") per span, and thus, smaller impact of NL effects and the interplay between NL and PDL effects. Since higher data rate transmission systems (i.e. 400 G/1 T) are more sensitive to fiber NL effects, the impact of the interplay between NL and PDL effects will be very important.

The present disclosure describes the statistics of the interplay between NL and PDL effects in dual polarization coherent systems for two types of widely deployed dispersion maps: DCM-less and in-line DCM. The present disclosure describes a significant interplay that may occur with in-line DCM, resulting in asymmetric Q-factor distribution with shorter tails on both sides. In DCM-less case the interplay is minimal with more symmetric Q-factor distribution and longer tails on both sides, leading to tenfold decrease in outage probability for BER=$10^{-2}$. The present disclosure also describes a novel 2-dimensional method with shift and rotate function for quick and easy analysis of interplay between NL and PDL effects, which could aid system design.

According to certain embodiments of the present disclosure, it may be advantageous to incorporate the statistical analysis into an optical transmission path computation engine, network design tool/system, or modeling tool/system. In some embodiments, the path computation engine, network design tool/system, or modeling tool/system may use those parameters to determine characteristics of the optical signal transmission path. The transmission characteristics of the optical signal transmission path may provide insight on how transmission degradation factors, such as nonlinear (NL) effects, polarization effects, such as polarization mode dispersion (PMD) and polarization dependent loss (PDL), and/or others may affect optical signals within the optical signal transmission path. To determine the transmission characteristics of the optical signal transmission path, the path computation engine, network design tool/system, or modeling tool/system may consider the interplay between the transmission degradation factors.

Figure 7:
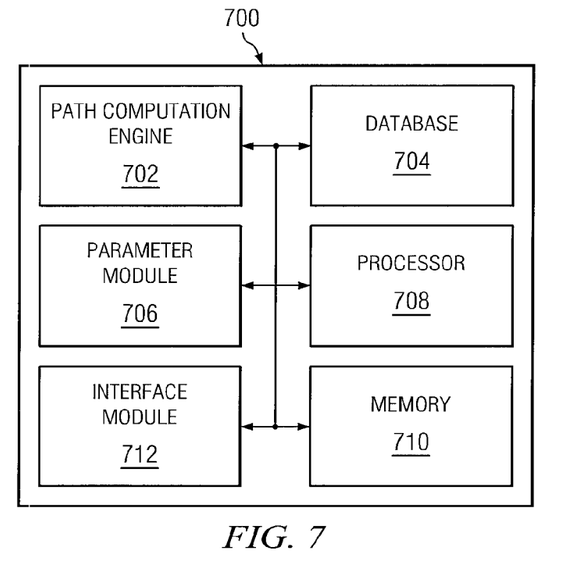
FIG. 7 is a block diagram of an example system for modeling transmission characteristics of an optical signal transmission path, in accordance with certain embodiments of the present disclosure.

FIG. 7 is a block diagram of an example system 700 for modeling transmission characteristics of an optical signal transmission path, in accordance with certain embodiments of the present disclosure. The system 700 may include a path computation engine 702, a database 704, a parameter module 706, a processor 708, a memory 710, and an interface module 712.

In some embodiments, interface module 712 may be configured to receive data concerning an optical signal transmission path in an optical network that is to be modeled. As an illustrative example, in some embodiments, interface module 712 may be configured to interface with a person and receive data about the optical signal transmission path. Alternately or additionally, interface module 712 may be configured to receive data about the optical signal transmission path from a device such as a computing device.

In some embodiments, interface module 712 may receive data about the optical signal transmission path, such as, fiber type; fiber length; number and/or type of components, such as a DCM, ADM, amplifier, multiplexer, or demultiplexer, in the optical signal transmission path; data rate; modulation format of the data; input power of the optical signal; number of signal carrying wavelengths, which may be referred to herein as channels; channel spacing; traffic demand; and/or network topology, among others.

Interface module 712 may also include and/or may be coupled to one or more input devices and/or output devices to facilitate receiving data about the optical signal transmission path from a user and/or outputting simulation results to a user. The one or more input and/or output devices may include, but are not limited to, a keyboard, a mouse, a touchpad, a microphone, a display, a touchscreen display, an audio speaker, or the like.

In some embodiments, parameter module 706 may be configured to provide parameters concerning the optical signal transmission path based on the data received about the optical signal transmission path by interface module 712. As an illustrative example, parameter module 706 may provide parameters regarding the fiber type, such as a dispersion map for the fiber type and other optical properties of the fiber type. As another example, parameter module 706 may provide parameters concerning the components in the optical signal transmission path. For example, the parameters of the components provided by parameter module 706 may include the PDL of the components and other optical properties of the components. In some embodiments, parameter module 706 may provide some of or all of the optical properties of the components in the optical signal transmission path that path computation engine 702 may use to model the optical signal transmission path.

Path computation engine 702 may be configured to use the parameters from the parameter module 706 and the data from interface module 712 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), amplified spontaneous emission (ASE) and/or others may affect optical signals within the optical signal transmission path. To determine the transmission characteristics of the optical signal transmission path, path computation engine 702 may consider the interplay between the transmission degradation factors.

In some embodiments, path computation engine 702 may provide the accumulated amount of each transmission degradation factor for the optical signal transmission path. Alternately or additionally, path computation engine 702 may provide the OSNR penalty due to each transmission degradation factor. Alternately or additionally, path computation engine 702 may provide the OSNR penalty due to a combination of one or more transmission degradation factors. For example, in some embodiments, a combined NL and PDL OSNR penalty may be higher than the combination of separately determined NL and PDL OSNR penalties because a combined NL and PDL OSNR penalty may take into account the interplay between NL effects and PDL effects in an optical signal transmission path, as described in more detail above with reference to FIGS. 1-6. Alternately or additionally, path computation engine 702 may provide the total OSNR of the optical signal transmission path. The total OSNR may be the optimal OSNR that may be achieved along the optical signal transmission path without any degradation. In some embodiments, path computation engine 702 may provide additional information regarding the optical signal transmission path.

Database 704 may be configured to store the data produced by path computation engine 702 about the optical signal transmission path. Processor 708 may be configured to execute computer instructions that cause the system 700 to perform the functions and operations described herein. The computer instructions may be loaded into the memory 710 for execution by processor 708 and/or data generated, received, or operated on during performance of the functions and operations described herein may be at least temporarily stored in memory 710.

To accurately simulate some of the transmission characteristics of the optical signal transmission path due to the randomly rotating states of polarization of an optical signal in the optical signal transmission path, path computation engine 702 may run a large number (e.g., at least a thousand) of simulations using varying states of polarization of the optical signal to determine the transmission characteristics of the optical signal transmission path. As an illustrative example, to simulate transmission characteristics such as the PDL and NL effects and interplay between the PDL and NL effects, path computation engine 702 may run at least a thousand simulations using varying states of polarization of the optical signal.

Figure 8:
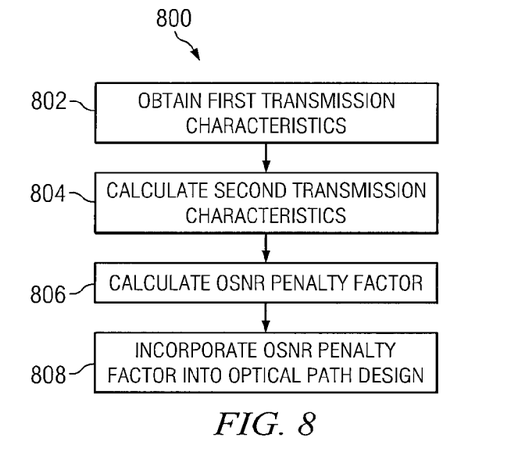
FIG. 8 is a flow chart of an example method of modeling an optical network, in accordance with certain embodiments of the present disclosure.

FIG. 8 is a flow chart of an example method 800 of modeling an optical network, in accordance with certain embodiments of the present disclosure. The method 800 may be implemented, in some embodiments, by a modeling system, such as system 700 described in more detail above with reference to FIG. 7. For instance, path computation engine 702 of system 700 may be configured to execute computer instructions to perform operations for modeling an optical network as represented by one or more of steps 802-808 of the method 800. Although illustrated as discrete steps, various steps may be divided into additional steps, combined into fewer steps, or eliminated, depending on the desired implementation.

In some embodiments, method 800 may begin at step 802, in which first transmission characteristics of an optical signal transmission path within an optical network may be obtained. The first transmission characteristics may be based on a parameter of the optical network. After obtaining first transmission characteristics, method 800 may proceed to step 804.

At step 804, method 800 may perform a plurality of simulations of the optical signal transmission path to produce second transmission characteristics of the optical signal transmission path. The simulations may be performed using the parameter and randomly changing states of polarization of the optical signal. For example, in some embodiments, 500, 1000, 5000, 10000, or some other amount of simulations may be performed. After simulating the optical transmission path to produce second transmission characteristics, method 800 may proceed to step 806.

At step 806, method 800 may incorporate the second transmission characteristics produced as a result of the simulations at step 804 to calculate an OSNR penalty factor to be incorporated into the design of the optical path. After calculating the OSNR penalty factor, method 800 may proceed to step 808.

At step 808, method 800 may incorporate the OSNR penalty into the design of the optical path by selecting path components with a higher or lower OSNR penalty factor than would otherwise be selected. For example, as described in more detail above with reference to FIG. 7, components such as a DCM, ADM, amplifier, multiplexer, or demultiplexer may be selected in a manner so as to accommodate the OSNR penalty.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. As an illustrative example, method 800 may further include generating a database that associates the OSNR penalty factor with a given optical path configuration. Although the present disclosure has been described in detail, it should be understood that various changes, substitutions, and alterations can be made hereto without departing from the spirit and the scope of the disclosure as defined by the appended claims.

What is claimed:

1. A system for modeling an optical signal transmission path of an optical network, the system comprising:
 a processor having access to memory media storing instructions executable by the processor to implement a path computation enabled engine to:
  generate a statistical analysis of an interplay between a first loss characteristic comprising a polarization dependent loss and a second loss characteristic comprising a nonlinear loss, the first and second loss characteristics associated with an optical signal within the optical signal transmission path, wherein the statistical analysis is based on a correlation shift between a first 2-dimensional (2D) data set and a second 2D data set, wherein the first 2D data set includes a first plurality of simulation values for the first loss characteristic, and wherein the second 2D data set includes a second plurality of simulation values for a combination of the first loss characteristic and the second loss characteristic;
  determine, based on the statistical analysis, a quantitative value associated with the interplay between the first loss characteristic and the second loss characteristic;
  generate an optical loss value wherein the optical loss value is based at least in part on the quantitative value associated with the interplay between the first loss characteristic and the second loss characteristic; and
  modify the optical signal transmission path, including incorporating the generated optical loss value into the optical signal transmission path by selecting a path component with a higher or lower optical loss value.

2. The system of claim 1, wherein the optical loss value is further based at least in part on a first Q-distribution of the first plurality of simulation values and a second Q-distribution of the second plurality of simulation values.

3. The system of claim 1, wherein the correlation shift corresponds at least in part to the second loss characteristic.

4. The system of claim 1, wherein the correlation shift comprises a rotation between the first 2D data set and the second 2D data set.

5. The system of claim 4, wherein the rotation is indicative of the interplay.

6. A method for modeling an optical signal transmission path of an optical network, the method comprising:
 generating, using a path computation engine, a statistical analysis of an interplay between a first loss characteristic associated with an optical signal within the optical signal transmission path and a second loss characteristic associated with the optical signal, wherein the first loss characteristic comprises a polarization dependent loss and the second loss characteristic comprises a nonlinear loss, and wherein the statistical analysis is based on a correlation shift between a first 2-dimensional (2D) data set and a second 2D data set, wherein the first 2D data set includes a first plurality of simulation values for the first loss characteristic, and wherein the second 2D data set includes a second plurality of simulation values for a combination of the first loss characteristic and the second loss characteristic;
 determining, based on the statistical analysis, a quantitative value associated with the interplay between the first loss characteristic and the second loss characteristic;

generating an optical loss value, wherein the optical loss value is based at least in part on the quantitative value associated with the interplay between the first loss characteristic and the second loss characteristic; and modifying the optical signal transmission path, including incorporating the generated optical loss value into the optical signal transmission path by selecting a path component with a higher or lower optical loss value.

7. The method of claim 6, wherein the optical loss value is further based at least in part on a first Q-distribution of the first plurality of simulation values and a second Q-distribution of the second plurality of simulation values.

8. The method of claim 6, wherein the correlation shift between the first scatter plot and the second scatter plot corresponds at least in part to a value of the interplay between the first loss characteristic and the second loss characteristic.

9. The method of claim 6, wherein the correlation shift comprises a rotation between the first 2D data set and the second 2D data set.

10. The method of claim 9, wherein the rotation is indicative of the interplay.

11. A non-transitory computer readable medium containing program instructions stored thereon for modeling an optical signal transmission path of an optical network, wherein the program instructions are executable by one or more processors to perform the steps of:

generating a statistical analysis of an interplay between a first loss characteristic associated with an optical signal within the optical signal transmission path and a second loss characteristic associated with the optical signal, wherein the first loss characteristic comprises a polarization dependent loss and the second loss characteristic comprises a nonlinear loss, and wherein the statistical analysis is based on a correlation shift between a first 2-dimensional (2D) data set and a second 2D data set, wherein the first 2D data set includes a first plurality of simulation values for the first loss characteristic, and wherein the second 2D data set includes a second plurality of simulation values for a combination of the first loss characteristic and the second loss characteristic;

determining, based on the statistical analysis, a quantitative value associated with the interplay between the first loss characteristic and the second loss characteristic;

generating an optical loss value, wherein the optical loss value is based at least in part on the quantitative value associated with the interplay between the first loss characteristic and the second loss characteristic; and modifying the optical signal transmission path, including incorporating the generated optical loss value into the optical signal transmission path by selecting a path component with a higher or lower optical loss value.

12. The computer readable media of claim 11, wherein the optical loss value is further based at least in part on a first Q-distribution of the first plurality of simulation values and a second Q-distribution of the second plurality of simulation values.

13. The computer readable media of claim 11, wherein the correlation shift corresponds at least in part to the second loss characteristic.

14. The computer readable media of claim 11, wherein the correlation shift comprises a rotation between the first 2D data set and the second 2D data set.

15. The computer readable media of claim 14, wherein the rotation is indicative of the interplay.

* * * * *